Figure 1:
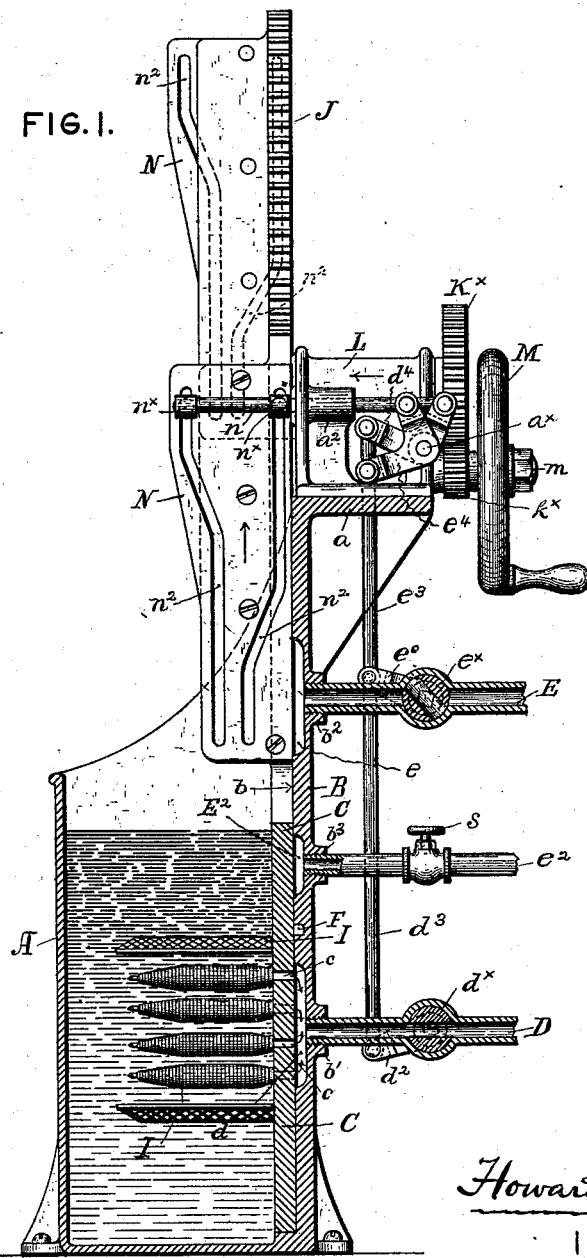

(No Model.) 3 Sheets—Sheet 1.

H. RICHMOND.
APPARATUS FOR DYEING, SCOURING, BLEACHING, AND OTHERWISE TREATING YARN IN COPS.

No. 372,767. Patented Nov. 8, 1887.

ATTEST.
J. Henry Kaiser
Victor J. Evans

Howard Richmond,
INVENTOR.
By his Attorneys,
H. C. Strawbridge
Bonsall Taylor (No Model.) 3 Sheets—Sheet 2.

H. RICHMOND.
APPARATUS FOR DYEING, SCOURING, BLEACHING, AND OTHERWISE TREATING YARN IN COPS.

No. 372,767. Patented Nov. 8, 1887.

(No Model.) 3 Sheets—Sheet 3.

H. RICHMOND.
APPARATUS FOR DYEING, SCOURING, BLEACHING, AND OTHERWISE TREATING YARN IN COPS.

No. 372,767. Patented Nov. 8, 1887.

ATTEST
J. Henry Kaiser
Victor J. Evans.

Howard Richmond,
INVENTOR
By his Attorneys,
W. C. Strawbridge
Bonsall Taylor

United States Patent Office.

HOWARD RICHMOND, OF PROVIDENCE, RHODE ISLAND.

APPARATUS FOR DYEING, SCOURING, BLEACHING, AND OTHERWISE TREATING YARN IN COPS.

SPECIFICATION forming part of Letters Patent No. 372,767, dated November 8, 1887.

Application filed August 27, 1887. Serial No. 248,043. (No model.)

*To all whom it may concern:*

Be it known that I, HOWARD RICHMOND, a citizen of the United States, residing in the city of Providence, county of Providence, and State of Rhode Island, have invented certain Improvements in Apparatus for Dyeing, Scouring, Bleaching, and otherwise Treating Yarns in Cops, of which the following is a specification.

My invention is of general applicability in dyeing, mordanting, bleaching, steaming, scouring, washing, drying, or otherwise treating yarns of cotton, silk, wool, worsted, or other animal or vegetable fiber, in the form of cops, or in kindred compact forms, by either sucking or forcing liquid dyes, or other liquids used in dyeing, mordanting, bleaching, scouring, steaming, or otherwise treating the cops, through the cops when mounted upon hollow perforated tubes, skewers, or injection spindles, which extend respectively through the cops and render every portion of each cop subject to the action of said liquids.

The foregoing operations broadly as such, and as separately conducted in the same or in different machines, are not novel with me, and attempts have heretofore been made, thereby, to practically dye, bleach, and otherwise treat, cotton and other yarns in cop and other compact forms. So far, however, as my knowledge extends, the practice has never been practically or successfully conducted upon a commercial scale, until the date of an invention made by one August Graemiger, a citizen of the Republic of Switzerland, application for patent for which was filed in the United States Patent Office upon April 14, 1887, and upon which application Letters Patent of the United States No. 368,715, were granted upon the 23d day of August, 1887, to which Letters Patent reference is to be made.

My present invention having the same objects and purposes as, and being an improvement upon, the aforesaid invention of the said Graemiger, it is essential for an accurate understanding of the features of distinction, that the objects and purposes and the salient characteristics of Graemiger's invention aforesaid should be briefly stated.

The object of Graemiger's invention, which is of general applicability for dyeing, bleaching, scouring, mordanting, drying, and otherwise treating yarns of various kinds in cop and other compact forms, is the provision of means whereby all of the cops composing any given series or succession, regular or irregular, of cops or of tiers or groups of cops, may, in the selected series or succession,—as to each cop, tier or group, successively, but as to the entire series or succession of given cops, tiers, or groups collectively,—be contemporaneously or simultaneously subjected each to its appropriate step of the contemporaneously conducted successive steps composing the selected process, of any one of which processes, however, continuity of operation in a greater or a less degree, is the especial desideratum and the salient characteristic.

To the foregoing ends the said Graemiger's said invention embraces apparatus having the capacity for performing or carrying out any one of several cognate processes or methods of treatment of yarn in cops or kindred compact forms, and apparatus, moreover, so constituted as to be readily convertible into, or applicable for use as, any one of several cognate yet distinct devices, respectively susceptible of the performance of a particular kind of work, that is to say of the practice of some one of the said several cognate processes, hereinafter mentioned, all of which, as processes or modes of treatment, are novel with Graemiger.

Broadly stated, Graemiger's aforesaid invention, so far as processes are concerned, as applied to dyeing, mordanting, bleaching, scouring, steaming, washing, or otherwise similarly treating by the impregnation of liquids, yarn in cops, comprehends, first, the contemporaneous but distributive subjection of the cops composing a series each in turn to its appropriate step of the following contemporaneously-conducted successive steps or operations, namely: first, saturation or impregnation by sucking or forcing the selected liquids through given cops; and, second, substitution of fresh cops to be charged for given charged cops.

Similarly, also, Graemiger's invention, as applied to the operations of impregnation above mentioned, comprehends, second, the subjection of the cops in the manner above stated, to the following successive steps or operations: First, saturation or impregnation by sucking or forcing the selected liquid through given cops; second, liquid-exhaustion by forcing or sucking air or other suitable fluid through given charged cops; and, third, substitution of cops to be charged and liquid-exhausted for given charged and liquid-exhausted cops.

Similarly, again, Graemiger's invention as applied to exhausting surplus liquid from charged cops, comprehends, third, the subjection of cops, in the manner above stated, to the following successive steps or operations: First, liquid-exhaustion by forcing or sucking air or other suitable fluid through the cops; second, substitution of cops to be liquid-exhausted for given liquid-exhausted cops.

Similarly, again, as applied to operations of dyeing with easily oxidizable liquid dyes, Graemiger's invention comprehends, fourth and fifth, the subjection of the cops in the manner above stated with reference to the first two operations which involve impregnation with liquids,—and in connection either with the two steps of saturation and substitution which are involved in the practice of the first of his foregoing processes, or else in connection with the three steps of saturation, liquid-exhaustion, and substitution which are involved in the second of his foregoing processes,—to a preliminary step of air-exhaustion before saturation or impregnation proper, by sucking or forcing air from out given cops to be charged or saturated.

Graemiger's invention further comprehends apparatus for conveniently effectuating the five several processes which respectively reside in the practice of the foregoing respectively recited connected steps or operations, the salient characteristic of which is that it is a rotary apparatus the cop carrier of which rotates referably to a fixed tank and the mouths of certain conduits.

In order that the apparatus which Graemiger devised for the purpose of carrying into operation any one of the above mentioned processes or methods of treatment may be understood, as it is important that it should be understood in order that the distinctions between it and my apparatus, which is designated to effectuate the same processes or methods of treatment, may become apparent,—it is proper to state briefly that Graemiger's machine comprehends; first, a fixed tank, vat, or other recipient for containing a given quantity of liquid coloring matter or other preferred liquid, and for subserving the purposes of a framework to the machine as an entirety; second, a carrier body which, referably to the fixed tank and the rotating cop carrier, is simply a fixed device conveniently subserving the double purpose, first, of being a fixed body with reference to which the cop carrier has rotary movement, and, second, of being a body containing or embodying, or of being a supporting device serving conveniently to present to the perforations in the cop carrier, the mouths or chambers of the conduits; third, a rotatable cop carrier, or device which carries the cops, which is perforated referably to the points of and means for attachment of said cops, and has such rotary movement referably to the carrier body and to the tank that its perforations are in predetermined continuing sequence placed in communication, preferably through perforated injection spindles, with the axial apertures of the cops on the one hand and with the conduit mouths on the other; fourth, a charging conduit in exterior communication with a suction or pressure pump, and interiorly or as to its mouth, conveniently through the intermediation of the carrier body, in communication for the time being with given perforations in the cop carrier; fifth, a liquid-exhausting conduit in exterior communication with a suction or pressure pump, and interiorly or as to its mouth, conveniently also through the intermediation of the carrier body, in communication for the time being with other given perforations in the cop carrier; sixth, an air-exhausting conduit in exterior communication with a suction or pressure pump, and interiorly or as to its mouth, conveniently also through the intermediation of the carrier body, in communication for the time being with other given perforations in the cop carrier.

Graemiger's machine also comprehends the employment of a dead face or blank space formed upon or embodied in the carrier body, which, however, I prefer not to employ.

Of the foregoing apparatus of Graemiger, the tank, the perforated cop carrier, the charging conduit, the liquid-exhausting conduit, the air-exhausting conduit, and,—as a device of convenience merely, for the purpose of conveniently presenting to given perforations of the cop carrier the mouths of said conduits, and as a device, moreover, with reference to which the cop carrier is conveniently arranged to rotate,—the carrier body, are the vital members, elements, or instrumentalities.

In order to understand the operation of the said Graemiger apparatus, it is sufficient to add that the cop carrier rotates relatively to the tank and the carrier body in such manner as, during a part of its rotation, to occasion the immersion in liquid in the tank of cops carried by it, and also, during a further part of its rotation, the presentation of its perforations with reference to which the cops are secured to it, to the mouths of the conduits.

The machine which I have invented, and which is represented in the accompanying drawings, is to be contradistinguished from the Graemiger machine chiefly in the fact that its cop carrier or cop carriers,—for it happens to be a machine in which two cop carriers are most economically employed,—reciprocate or move backward and forward in a level or a right-lined plane or planes as opposed to rotating or moving in a circular plane.

My machine, therefore,—which, as stated, equally with Graemiger's is adapted to effectuate the process which comprises charging and substitution,—or the process which comprises charging, liquid-exhaustion, and substitution,—or the process which comprises liquid-exhaustion and substitution,—or the process which comprises air-exhaustion, dyeing, and substitution,—or the process which comprises air-exhaustion, dyeing, liquid-exhaustion, and substitution,—is of the following construction, and comprehends all of the elements which are necessary to the conduct or practice of any one of the foregoing processes, and consequently of that one which involves the greatest number of steps,—although, as is hereinafter explained, in the practice of such of the processes as involve the lesser number of steps, certain of the elements of the said apparatus are inert or for the time being thrown out of action.

Apparatus conveniently embodying my invention, and adapted to effectuate the separate practice of any one, and, consequently of all, of the processes invented by Graemiger and hereinbefore referred to, is represented in the accompanying drawings and described in this specification, the particular subject matter claimed as novel being hereinafter definitely specified.

Figure 2:
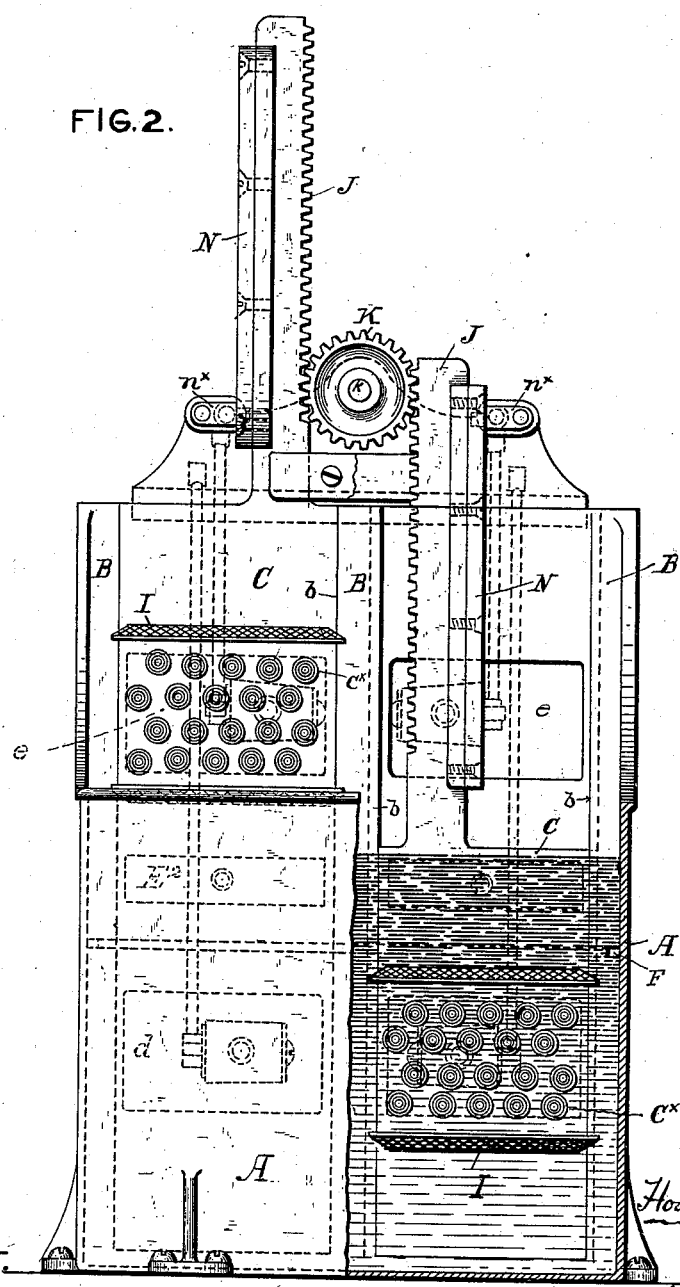
Figure 3:
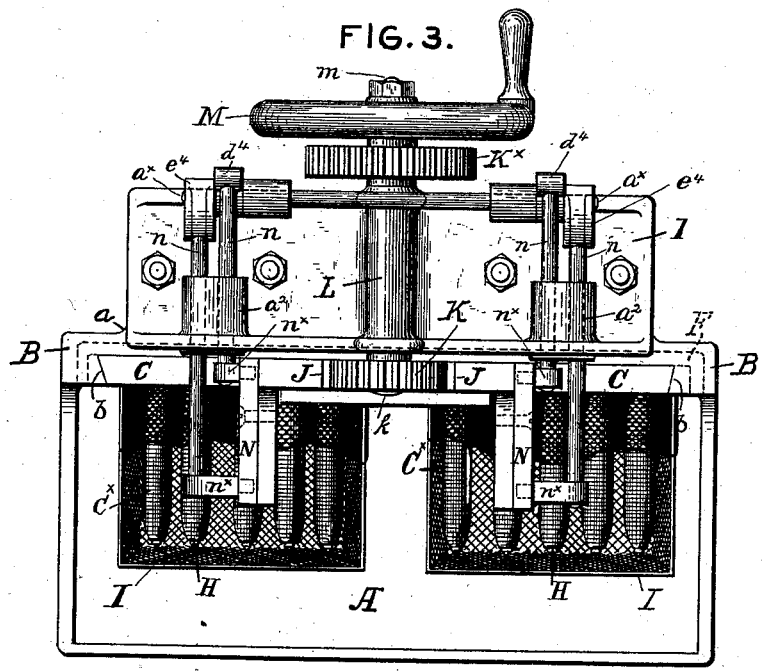
Figure 4:
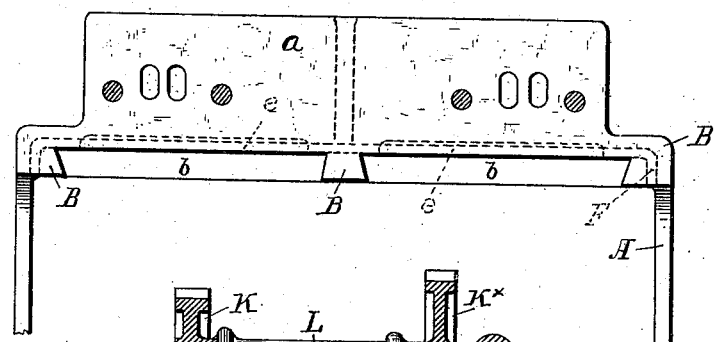
Figure 5:
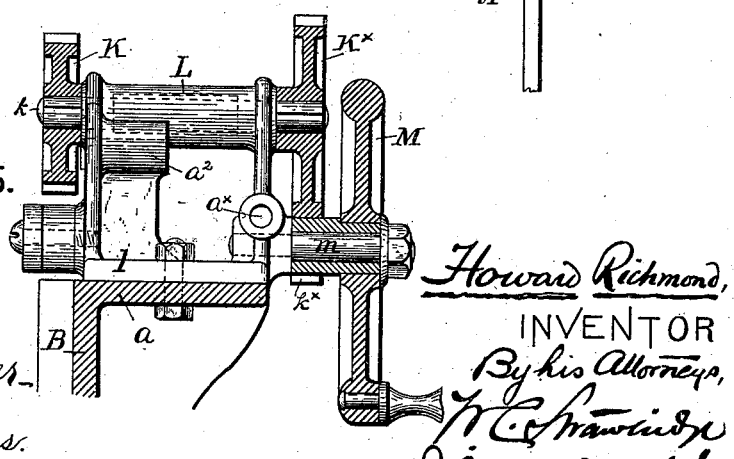

In the drawings, Figure 1 is a side elevational view of the entire machine, viewed from the right hand side of said machine as represented in Figs. 2 and 3,—the tank, the right hand cop carrier, and the right hand side of the carrier body in the region of its conduits, being, for clearer illustration, shown in section. Fig. 2 is a front or face elevational view of the entire machine, the right hand side portion of the front of the tank being, for clearer illustration, broken away. Fig. 3 is a top plan view of the machine represented in Figs. 1 and 2. Fig. 4 is a fragmentary plan of a portion of the tank and the carrier body, the view being especially designed to show the carrier ways in said carrier body, and also to exhibit the bracket upon which the train of gearing is mounted. Fig. 5 is a fragmentary side elevational detail, partly sectional, of the train of gearing which I find it convenient to employ, for operating the cop carriers.

Similar letters of reference indicate corresponding parts.

In the drawings, A is a tank or fixed receiving vessel, preferably of such form and strength as to itself constitute or act as the frame-work of the entire apparatus, that is to say as a frame-work with reference to which the cop carriers have movement and the carrier body and conduits are fixed. This tank is well made when of the form shown, that is to say with its front wall very much lower than its rear wall. The rear wall of this tank preferably constitutes the carrier body B, and is of considerable thickness to contain or embody two dove-tailed grooves or carrier ways $b$, preferably parallel and vertical, within which the cop carriers C are fitted for reciprocation, and also the charging, liquid-exhausting, and air-exhausting chambers hereinafter referred to. The carrier body, as an entirety, being thus preferably a component of the tank, is necessarily fixed referably thereto, so that the carrier or carriers traversing its grooves are adapted to descend into or arise from out said tank.

D are a pair of charging conduits, preferably fixedly connected with the tank by being respectively screwed into bosses $b'$, rearwardly off-set from the rear face of the carrier body or rear wall of said tank, upon a common level some distance below the top level of the tank as determined by the height of the front wall of said tank, and each, preferably at a point central with respect to one of the ways in said carrier body. These charging conduits lead to or are exteriorly in direct communication each with a separate or, preferably, both with the same suction or pressure pump, of any preferred character, and adapted to either suck or force any desired liquid through the conduits for the saturation, impregnation, or charging of given cops.

E are a pair of liquid exhausting conduits, preferably fixedly connected with the tank by being respectively screwed into bosses $b^2$, rearwardly off-set from the rear face of the carrier body or rear wall of said tank, upon a common level some distance above the top level of the tank as determined by the height of the front wall of said tank, and each, preferably at a point central with respect to one of the ways in said carrier body. These liquid-exhausting conduits lead to or are exteriorly in direct communication each with a separate, or, preferably, both with the same suction or pressure pump, of any preferred character, and adapted to either suck or force air or other fluid, employed as a liquid-exhausting medium for the liquid-exhaustion of given cops, through the liquid-exhausting conduits.

$e^2$ are a pair of air-exhausting conduits, preferably fixedly connected with the tank by being screwed into bosses $b^3$, rearwardly off-set from the rear face of the carrier body or rear wall of said tank, upon a common level immediately below the top level of the tank as determined by the height of the front wall of said tank, and each, preferably at a point central with respect to one of the ways in said carrier body. These air-exhausting conduits lead to or are exteriorly in communication each with a separate, or, preferably, both with the same suction or pressure pump, of any preferred character, (which may be the identical pump used in connection with the liquid-exhausting conduits,) and adapted to suck air through said air-exhausting conduits, for the air-exhaustion of given cops.

I have not represented in the drawings the pumps referred to, for the reason that it is not necessary to an understanding of the invention,—the pumps being simply, as stated, of any preferred and well known character, and there being no connections other than those which a competent mechanic would naturally employ.

The carrier body is of sufficient thickness to permit of there being formed in it, preferably in its casting, certain chambers, depressions, or compartments, each independent of the other. The chambers in the carrier body represented (and all of the chambers are double or in two similar series, one of each being applied within the compass of each of the two ways of said carrier body), are the charging chambers $d$, the liquid-exhausting chambers $e$, and the air-exhausting chambers $E^2$,—the said chambers being the terminal portions or mouths, respectively, of the charging conduits, the liquid-exhausting conduits, and the air-exhausting conduits.

The charging chambers $d$ open within the tank and wholly beneath the lowest possible level of liquid in said tank. The charging conduits are respectively in communication with the respective charging chambers. The liquid-exhausting chambers $e$ are formed within the carrier body and wholly upon a level superior to that of the highest possible level of liquid within the tank. The liquid-exhausting conduits are respectively in communication with the respective liquid-exhausting chambers.

The air-exhausting chambers $E^2$ are respectively formed within the carrier body intermediately between each pair of charging and liquid-exhausting chambers, and are located immediately below the normal level of the liquid in the tank. The air-exhausting conduits are respectively in communication with the respective air-exhausting chambers. Each chamber of a given series is entirely distinct from and unconnected with any other chamber of said series, or of the other series.

The breadth of all of the chambers of each series,—and it will be understood that a series is composed of a charging chamber, an air-exhausting chamber, and a liquid-exhausting chamber,—is, preferably, almost equal to the breadth of the carrier way within which said series is located, and of each series the liquid-exhausting chambers alone are above the normal level of the liquid in the tank, that is to say above the liquid-containing body of the tank proper.

All of the foregoing chambers are, in effect, sunken portions, recesses, or depressed compartments, in the front face of the carrier body within the breadth or area of its carrier ways.

Instead of making the chambers referred to in the form of extended recesses, it is, as is apparent, quite possible to make them as a series of minor chambers, or channels, or perforations, through the carrier body, in communication upon the one hand with the conduits the mouths of which they would in such case collectively constitute, and on the other hand adapted to register with given perforations in the cop carrier.

As this machine as shown in the drawings, is not constructed to embody a dead face proper, that is to say a dead face area, strictly as such, the solitary function of which it is to be simply a fixed blank surface, open space, or open or closed blank chamber, formed upon or embodied in the carrier body, and so located above the level of any liquid in the tank as to act in connection with cops above said level to permit of their being replaced by other cops,—it is proper to explain that, in this machine, I employ the respective mouths of the respective liquid-exhausting conduits to fulfill the functions of Graemiger's dead face, *per se*, and to be respectively operative in connection with the respective cop carriers, it being manifestly apparent that it is possible to perform the operation of substituting fresh or untreated cops for charged and liquid-exhausted cops, over the mouths of the respective liquid-exhausting conduits, and even while the pumps in exterior communication with said conduits are in action, as the continued operation of said pumps cannot prevent the operation of substitution. It is proper, however, for me to explain that an extended area of the carrier body above the liquid-exhausting chambers can be employed as a dead face proper, and that I have in contemplation, and propose to apply for patent upon, a machine in which the carrier body is, as stated, extended upward to form a dead face proper.

F is a transversely extended dye slot channeled across the front face of the carrier body in the region between the charging chambers and the air-exhausting chambers, opening into the carrier ways and also opening through the front of said carrier body at each side thereof close to or alongside of the inner face of the side walls of the tank. This slot, which lies considerably below the level of the liquid in the tank, being open at both extremities, is constantly full of liquid in the tank, and serves as a liquid packing between the charging and the air-exhausting and liquid-exhausting chambers. This slot, however, is but a modified form of the dye-slots set forth and claimed in Graemiger's application for patent, and subserves in all respects the same purposes as said dye-slots,—its especial importance being in the operation of dyeing with indigo white solution to serve as a safeguard to prevent suction of air by the charging pump when employed as a suction device (its preferable employment) from the air-exhausting or liquid-exhausting chambers into the charging chamber.

Having now described the construction of the carrier body, and how that it is a convenient device for the purpose of conveniently presenting to given perforations of the cop carriers the terminal portions or mouths of the respective charging conduits, liquid-exhausting conduits, and air-exhausting conduits, and a device, moreover, with reference to which the said carriers are conveniently arranged to reciprocate,—C are the cop carriers, the same being a pair of preferably counterpart plates or webs mounted for reciprocating movement upon or against the front face of the carrier body, or that face which fronts into said tank, and, conveniently, respectively maintained in place within the re- spective carrier ways of said body, by being provided with longitudinally extending lateral dove-tailed tongues adapted to the dove-tailed grooves formed along the longitudinal lateral edges of said carrier ways. Each of these cop carriers being applied to its respective carrier way, is adapted to have movement vertically within said way, and is fitted as to its back face so exactly to the front face of the carrier body as to close such of the chambers in said carrier body as it, the said carrier, happens to come in front of. Each cop carrier is provided with a series of perforations $c$ passing from its inner to its outer face, the office of which is to permit the passage of selected liquid, of air, or of liquid-exhausting or other fluid, to or from cops $C^x$ applied to the exterior of the carrier, and as to their hollow cores in communication with said perforations. These perforations may be of any desired form. They are preferably holes threaded to receive hollow nipples fitted to receive removable perforated injection tubes H thrust through the cops and conveniently of a construction invented by the said Graemiger. Instead, however, of employing these nipples, the injection tubes or the cops themselves may be adapted to be fitted directly to the perforations. A single group of these perforations is applied to each carrier, each of the groups being composed of a given number of, vertically considered, transversely disposed lines or tiers of perforations.

In the drawings I have represented each carrier as equipped with a single group of twenty perforations, that is to say, composed of four tiers, five perforations to a tier. The aggregate area of carrier surface occupied by each group is less in extent than the area of the charging chambers and the liquid exhausting chambers, which chambers are all preferably of the same area; and this relative proportioning is for the purpose of presenting all of the perforations which form a group simultaneously to either a charging chamber or a liquid-exhausting chamber, so that all of said perforations are simultaneously subject to the action of the liquid or fluid circulating through the conduit which terminates in a given charging or liquid-exhausting chamber.

I are screens projecting, preferably at right angles, from the cop carriers both above and below their respective groups of perforations. These screens have projection exceeding that of the applied cops, and serve to take up, collect, or push aside the scum accumulating on the surface of the liquid in the tank, and thus to keep it off the cops both as the latter are immersed in and as they emerge from the liquid. The screens are preferably beveled at their outer edge, but may be made of any preferred form, it being better that they should present an angular or beveled face. These screens as applied to a cop carrier are the invention of the aforesaid August Graemiger.

Reciprocation may be imparted to the carriers in any preferred manner. A good way is to provide each carrier with a vertically extending toothed rack J, the teeth of the respective racks facing each other at a predetermined distance apart, and to provide a toothed carrier pinion K of suitable diameter to gear with the teeth of both racks. It is obvious that a given rotation imparted to this carrier pinion will occasion the opposite reciprocation of the racks and their connected cop-carriers, so that when one of said carriers has been caused to descend to the full limit of its throw down into the tank, the other carrier will have been caused to ascend to the full limit of its throw up from out said tank, as shown in Fig. 2; and in this reversed position of the respective carriers it is to be observed that the group of perforations in the carrier which is within the tank presents to or registers with the mouth of the charging chamber in connection with which said carrier operates, while the group of perforations in the carrier which is elevated from out the tank presents to or registers with the mouth of the liquid-exhausting chamber in connection with which said carrier operates.

A reverse throw of the carrier pinion and consequently a reverse reciprocation of the respective carriers will occasion a precisely opposite relationship of the parts referred to.

I find it convenient to mount the carrier pinion K fixedly upon an arbor $k$ housed within a boxing L conveniently forming part of a housing $l$ erected from a bracket, $a$, formed upon or applied to the carrier body near the top of and rearwardly extending from said bracket. At the outer extremity of the arbor $k$, I fixedly apply a toothed spur wheel $K^x$, which meshes with a toothed wheel pinion $k^x$, formed upon or connected with the hand wheel, M, mounted upon a fixed shaft $m$ parallel with the arbor $k$, and rearwardly projecting from the bracket $a$ with which said shaft is fixedly connected.

It is obvious that the throw of the hand wheel will through the toothed wheel pinion, toothed spur wheel, and arbor, occasion the throw of the toothed carrier pinion K in either direction, according to the direction of throw of said hand wheel.

While I prefer to reciprocate each of the carriers simultaneously and oppositely, and by the employment of such a train of gearing as the foregoing, I do not restrict myself to such mode of or means for operating the said carriers, as it is within my invention to employ but a single carrier, or, employing two or more, to elevate and lower them reversely or together by means of any mechanical appliances adapted for the purpose.

My preference is for two carriers, and my reason for operating the said carriers oppositely and by the throw of a pinion common to both, is that it enables me with a machine of a given capacity to do in a given space of time a maximum of work, because, while the group of cops applied to one of the carriers is being charged, the group applied to the other can be first liquid-exhausted and then replaced by a group of fresh cops to be charged.

In such a reciprocating machine as that represented, or one in which two oppositely acting parallel cop carriers are employed, I prefer to unite the two charging conduits represented at a point not remote from their connection with their respective charging chambers, and continue them to a common pump as a single conduit. I prefer also to resort to a similar arrangement in connection with the two liquid-exhausting conduits and the two air-exhausting conduits represented in the drawings. I then provide each branch or double portion of the charging conduit with a cock or valve $d^x$, and each branch of the liquid-exhausting conduit with a cock or valve $e^x$, and provide the aforesaid valves respectively each with valve levers $d^2 e^9$, respectively connected with the valve rods $d^3 e^3$ extending vertically upwards and connected respectively with the horizontal arms of bell crank levers $d^4 e^4$, pivoted upon fixed studs $a^x$, the vertical arms of which levers are connected with slide rods $n$, which rods pass through tubular slide bearings $a^2$ erected from the bracket $a$, and at their front extremities are provided with cam toes $n^x$, entered within independent cam grooves $n^2$ formed in separate cam way plates N connected with the respective cop carriers, or, more strictly, with the racks erected therefrom,—all as clearly shown in the drawings.

Each of the foregoing cam way plates having two cam grooves of different paths, and each of said grooves operating upon the cam toe of a given and distinct slide rod, connected, through the medium of a given bell crank lever and valve rod with a given valve,—it will be readily understood that one of the said cam way grooves of each cam way plate will control the valve upon the charging conduit in communication with the charging chamber in connection with which the cop carrier with which the said cam way plate, of which said cam groove is a part, is connected, operates,—while the other groove will, by a similar but distinct connection, control the valve upon the liquid-exhausting conduit operating in connection with the said carrier.

The result of the application of a cam way plate to each carrier,—and it is of course to be understood that the contrivance as an entirety is in duplicate, one set of the aforesaid devices being employed in connection with each carrier,—is that the valve in the liquid-exhausting conduit of the carrier the group of perforations of which happens for the time being to be in registry with the charging chamber, is closed, and the valve on the charging conduit open,—while the valve on the liquid-exhausting conduit of the other carrier the group of perforations of which, as the machine is organized, happens to be in registry with the liquid-exhausting chamber, is open, and the valve upon the charging conduit operating in connection with the said last named carrier closed,—and that upon a reversal of the position of the respective carriers, a reversal of the position of the valves takes place.

The opening and closing of the valves is, by the application of the foregoing devices, rendered automatic and a resultant of the movement of the carrier pinion in occasioning the reverse reciprocation of the carriers.

While the arrangement of cam ways, slide rods, bell cranks, and valve rods, shown and described, is a convenient one to effectuate the reversal of the valves,—it is but one of many mechanical contrivances which may be resorted to for the same purpose.

As it is apparent that such conduits as, in any selected operation of which the machine is capable, are, for the time being, not desired for work, should be disconnected from their chambers, as, for instance, by the valve arrangement above described, it is apparent that other contrivances than the valves set forth can be employed to effect the requisite disconnection, and it is, therefore, obvious that by increasing the height of the machine, and increasing the length of each of the cop carriers in both directions beyond their respective groups of perforations, the extended portions of each of said carriers may be employed to close either the liquid-exhausting or the charging chamber in connection with which said carriers respectively operate, when either of said chambers happens to be an inactive chamber or one which is out of registry with the perforations in their said carrier. The said extended portions of the carriers in such case, therefore, constituting blank plates to cover the said inactive chambers, and shut them off, the said plates being in the nature of valves to the conduit chambers or mouths of the conduits.

In the drawings I have represented stop cocks $s$ applied to the air-exhausting conduits, to shut them off at will; but, instead of employing stop cocks, valves similar to those applied to the charging and liquid-exhausting conduits may be applied to the said air-exhausting conduits and operated in a similar manner,—and it is preferable to use such valves when indigo dyeing is to be continuously or alone performed upon the machine.

Such being a description of a preferred form of apparatus adapted to effectuate my invention, it will be apparent that it is adapted for the practice of any one of the five processes invented by Graemiger, to which I have hereinbefore referred. Thus by throwing the pump or pumps operating in connection with the air-exhausting and the liquid-exhausting conduit or conduits entirely out of action, the process of dyeing, scouring, bleaching, or otherwise treating the cops by impregnation of a selected liquid, and of replacing the impregnated cops with others to be impregnated,—can be practiced. Thus, again, by shutting off the air-exhausting chamber from communication with its pump, the operation of charging or saturation with liquid, liquid-exhaustion, and substitution of or replacing the cops, can be performed. It is to be remarked that the foregoing operation can, in fact, be performed without discontinuing the operation of air-exhaustion, inasmuch as the said operation, although inert for useful purposes in any operation except that of indigo dyeing, is harmless in any other operation involving saturation. Thus, again, by throwing the charging pump out of operation or by shutting off the charging conduit from communication with said pump, and by removing all liquid from the tank, which in such case becomes simply a fixed supporting framework, the operation of liquid-exhausting cops which have been in any other machine impregnated with the desired liquid, and of replacing said liquid exhausted cops with fresh cops to be liquid-exhausted, can be performed. Thus again, by shutting off the liquid-exhausting chamber from communication with the liquid-exhausting pump, the operation of air-exhaustion, impregnation, and substitution of cops can be performed. Thus, finally, all of the conduits being in communication with their respective pumps, either the operation of air-exhaustion, impregnation, liquid exhaustion, and substitution of cops; or, the liquid-exhausting pumps being out of action, the foregoing operation, omitting the step of liquid-exhaustion, can be performed either with readily oxidizable liquid dye stuffs in the operation of dyeing, or with any desired liquid in any selected operation involving saturation of the cops.

The best results are obtained by employing both the liquid-exhausting and the charging pumps as suction pumps, and by operating an independent pump (although the liquid-exhausting pump may be used) as a suction pump to perform, when desired, the work of air-exhaustion.

Assuming the pumps operated as suction devices, the following is a description of the operation of my apparatus as represented and hereinbefore described, in carrying out the process of charging, impregnation or saturation, liquid-exhaustion, and substitution of charged and liquid-exhausted cops for fresh or untreated cops to be charged and liquid-exhausted,—an operation itself a type of all the others. The desired liquid is introduced into the tank to about the level represented in the drawings, that is to say to a level considerably above the dye slot F, and also sufficiently above the air-exhausting chamber to permit of the complete immersion of a tier of radially projecting cops happening in the movement of their carrier to be in registry as to their perforations with said air-exhausting chamber. The charging pump is conveniently provided with a return pipe so as to return to the tank as much of the liquid employed as is not absorbed by or does not remain in the cops, the liquid being thereby in constant circulation from the tank to the pump and from the pump back to the tank, or vice versa. In other words, a constant circulation takes place through both the charging pump and the cops, and the liquid in the tank is reduced only by such quantity of liquids as remains in the cops. The reduction, however, when carried to an extent affecting the normal level of the supply of dye-stuff to the tank to be compensated for and the level maintained, by fresh supplies. The machine being supposed unprovided with cops, one of the cop carriers is then raised and the other lowered to the full limit of their respective movement: The perforations of the cop carrier which has been raised being, therefore, above the level of the liquid in the tank and in registry with the liquid-exhausting chamber in connection with which said carrier operates,—a cop is, by an attendant, supplied to each of the aforesaid perforations, and the said carrier is then, by the operation of the hand wheel, caused to descend to the extent of its downward movement and a sufficient distance to occasion the complete immersion of the group of cops so applied and the presentation of the perforations to which they are applied to the charging chamber in connection with which the carrier under consideration operates. The pump in connection with the said charging chamber, being, as is preferred, supposed in operation as a suction pump, thereupon, through the aforesaid perforations of the carrier, through the charging chamber aforesaid, and through its charging conduit, sucks enough of the liquid contained in the tank through the substance of each of the cops of the immersed group, to occasion the saturation and complete impregnation with said liquid of the threads composing each of said cops. While the charging pump is acting upon the immersed group of cops referred to, the attendant has supplied to the perforations of the other or second carrier (which by the same action of the carrier pinion and hand wheel that occasioned the descent of the cop carrier first considered, has been raised above the level of the liquid and into registry with the liquid-exhausting chamber operating in connection with it the said other carrier) a set of fresh or untreated cops to be charged. So soon as he has done this, further reverse rotation imparted to the hand wheel will occasion the descent of said second carrier and the immersion of the unimpregnated cops applied thereto, and also the simultaneous ascent of the carrier first considered with its charged cops, until the perforations to which the latter are applied register in connection with the liquid-exhausting chamber operative with said first carrier, and are subjected to the action of the pump in communication with said liquid-exhausting chamber so as to be liquid-exhausted of such surplus liquid as they contain at the time of their emergence from the tank. So soon as this operation of liquid-exhaustion has been performed, the charged and liquid-exhausted cops of the first carrier are removed by the attendant, and their places supplied by a group of fresh or untreated cops; after which, a further reverse movement of the hand wheel and pinion will occasion the second descent of the first carrier with its newly applied group of untreated cops, and the first ascent of the second carrier with its charged cops until the latter are above the level of the liquid and in registry with the liquid exhausting chamber of said second carrier so as to be liquid-exhausted; after which they are removed and a further group of fresh or untreated cops applied to said second carrier, which is then actuated to its second descent.

A continuance more or less rapid of the foregoing operation, constitutes a practice of that process of which liquid exhaustion, impregnation, and substitution, are the steps, and which, as an entirety, is perhaps the most important process which my machine is adapted to effectuate.

When liquid-exhaustion is not desired, or is intended to be performed in a separate machine, the liquid exhausting chambers are both cut off, and the liquid exhausting pump or pumps thrown out of action; whereupon the above described operation becomes simply an operation of charging and cop replacing.

I prefer, as stated, to conduct both of the foregoing operations by sucking both the charging liquids and the air from the outer surfaces of the cops inward, but it is obvious that the same result can be secured by forcing impregnating liquid and liquid-exhausting fluid from the core of the cops outwardly to their surfaces. I prefer, also, to use pumps, strictly as such, to force or suck the liquids and fluids utilized, but any other forcing or liquid-exhausting devices may be employed in the stead of pumps, and in the claims, where reference is made to them, I use the word pump generically.

When easily oxidizable liquid dyes, such, for instance, as indigo white solution, are employed in indigo dyeing, it is important to keep air out of the solution to prevent its combining with the white indigo to form insoluble indigotine; and therefore it is of advantage to extract or exhaust the air from the cops before subjecting them to the action of the charging conduit; because, otherwise, the insoluble indigotine, being sucked or forced into the cops by the action of the charging pump, would collect in the fibers of the cops and prevent the proper circulation of the dye stuff through said cops in the operation of the charging proper. This I conveniently accomplish by the aid of the air-exhausting conduits $e^2$ and their air-exhaust chambers $E^2$ hereinbefore referred to, the perforations constituting each transverse tier of perforations of a given group of cops, being presented in turn across the face of a given air-exhausting chamber, as their carrier is caused to descend to occasion the immersion of the group in question, and the cops of each of said tiers being therefore subjected to the action of the air-exhausting pump,—that is to say, to an air suction,—before they come into communication with the charging chamber, and, in such communication, are, as stated, subjected to the action of the charging pump.

It will be apparent that in conducting the foregoing operation the cops will become more or less filled with the indigo solution. The period during which a given tier presents over the air-exhausting chamber is, however, in the movement of the carrier, so limited that no impregnation saturation or charging proper, in the sense of a thorough circulation of liquid through the cops, takes place; and the operation of air-exhaustion is not, therefore, one of charging or saturation in the sense in which those terms are, in this specification, employed as applied to the operations conducted through the medium of the charging chamber by the action of the charging pump. Such of the dye stuff, moreover, as is, by the operation of the air-exhausting pump, drawn through the cops and into the air-exhausting chamber, and as has become oxidized, is not, as is apparent, admitted into the tank at all, but is drawn off to the air-exhausting pump, from which, in practice, it is discharged into a special vessel and deoxidized before being again supplied to the tank.

The air-exhausting chambers may, as stated, be employed either with or without the liquid-exhausting chambers, the latter being either active or inert at the will of the operator.

In order to employ my apparatus for scouring, bleaching, steaming, mordanting, or washing yarn in cops, it is apparent that it will be only necessary to supply the desired bleaching or other selected, liquid to the tank and charging pump, and to repeat in connection with such liquid the operation already described.

If desired, the liquid-exhausting pump can be replaced by an injector, or kindred device employed to inject steam through the cops, or, the apparatus being placed in a hot chamber, the liquid-exhausting pump may be used to exhaust or draw hot air through them.

It is essential to the highest commercial success, that the various steps of any one of my processes which my machine is capable of performing, should be rapidly and continuously performed.

Having thus described both the construction and the mode of operation of a machine conveniently embodying my invention, it is proper to state that, while the special form and construction and the special relative arrangement of the elements of my invention, hereinbefore detailed—namely: the tank, cop carriers, carrier body, charging conduit, liquid-exhausting conduit, and air-exhausting conduit, is the cheapest and most convenient construction form and arrangement of which I now have knowledge, I do not restrict myself to it,—as it is evident that my invention is broad enough to comprehend other applications of a reciprocating cop carrier, or carriers, which has or have movement to and fro in a plane or planes and with respect to a fixed tank and the mouths or terminal portions of the aforesaid conduits. Thus, while it is preferable to employ two cop-carriers, but one, or more than two, carriers may be employed; and while, except in the employment of the apparatus for liquid-exhausting only, it is essential that the carriers should be capable of such reciprocating relatively to a tank containing liquid as will during a part of the said reciprocation occasion the immersion in the liquid in the tank of cops carried by said carriers, it is immaterial how, or to what extent, such a reciprocating be effected, and whether it be slowly continuous, or, as is preferable, intermittent. Thus, again, while it is essential, when charging, either alone or in connection with other operations, is a step of the process for the time being under practice, that a charging conduit should act to conduct liquids to or from given perforations of the cop carrier in communication, as stated, with given cops,—and that a liquid-exhausting conduit, when liquid exhaustion, either alone or in connection with charging, is a step of the process for the time under practice, should similarly act to conduct air to or from given cops,—it is immaterial through the medium of what form of discharging orifice, mouth, or other aperture adapted to register or align itself for the time being with the perforations, such conduit or conduits do so act. Thus, again, while I prefer to constitute the carrier-body the back wall of the tank, and to apply the carriers to dove-tailed grooves formed in said carrier body, it is apparent that the carrier body may be a device independent of the tank proper, and that the carriers may be otherwise than by grooves applied to, and connected for their reciprocating movement with, said carrier body. And it is also equally apparent that the carrier or carriers and their carrier body may be curved in cross section rather than flat, as shown. Thus, as stated, while I prefer to apply special valves to the various conduits, and to operate said valves by such special devices as have been hereinbefore described, I do not restrict myself thereto.

Having thus described my invention, I claim and desire to secure by Letters Patent:—

1. In combination, a reciprocating cop carrier having perforations in communication with which cops are applied to said carrier, and one or more fixed conduits over the mouths of which the perforations of the carrier are caused to present as the carrier is caused to reciprocate, substantially as and for the purposes specified.

2. In an apparatus for dyeing, bleaching, or otherwise treating, yarn in cops, the following instrumentalities in combination: first, a fixed tank; second, a perforated reciprocating cop carrier; third, a charging conduit in communicating with a charging pump, substantially as set forth.

3. In an apparatus for dyeing, bleaching, or otherwise treating, yarn in cops, the following instrumentalities in combination: first, a fixed tank; second, a perforated reciprocating cop carrier; third, a charging conduit in communication with a charging pump; and, fourth, a liquid-exhausting conduit in communication with a liquid-exhausting pump, substantially as set forth.

4. In an apparatus for treating yarn in cops, the following instrumentalities in combination:—first, a fixed frame-work; second, a perforated reciprocating cop carrier; and, third, a liquid-exhausting conduit in communication with a liquid-exhausting pump; substantially as set forth.

5. In an apparatus for dyeing, bleaching, or otherwise treating, yarn in cops, the following instrumentalities in combination: first, a fixed tank; second, a perforated reciprocating cop carrier; third, a charging conduit in communication with a charging pump; and, fourth, mechanism, essentially for instance, such as set forth, for imparting to the cop carrier a predetermined movement of reciprocation with respect to the tank and charging conduit, substantially as set forth.

6. In an apparatus for dyeing, bleaching, or otherwise treating, yarn in cops, the following instrumentalities in combination: first, a fixed tank; second, a perforated reciprocating cop carrier; third, a charging conduit in communication with a charging pump; fourth, a liquid-exhausting conduit in communication with a liquid-exhausting pump; and, fifth, mechanism, essentially, for instance, such as set forth, for imparting to the cop carrier a predetermined movement of reciprocation with respect to the tank, charging conduit, and liquid-exhausting conduit, substantially as set forth.

7. In an apparatus for treating yarn, in cops, the following instrumentalities in combination: first, a fixed tank; second, a perforated reciprocating cop carrier; third, a charging conduit in communication with a charging pump; fourth, suitable means essentially, for instance, such as set forth, for maintaining the foregoing instrumentalities in their given relative disposition; and, fifth, mechanism, essentially, for instance, such as set forth, for imparting to the cop carrier a predetermined movement of reciprocation with respect to the tank and charging conduit, substantially as set forth.

8. In an apparatus for dyeing, bleaching, or otherwise treating, yarn in cops, the following instrumentalities in combination: first, a fixed tank; second, a perforated reciprocating cop carrier; third, a charging conduit in communication with a charging pump; fourth, a liquid-exhausting conduit in communication with a liquid-exhausting pump; fifth, suitable means, essentially, for instance, such as set forth, for maintaining the foregoing instrumentalities in their given relative disposition; and, sixth, mechanism, essentially, for instance, such as set forth for imparting to the cop carrier a predetermined movement of reciprocation with respect to the tank, charging conduit, and liquid-exhausting conduit, substantially as set forth.

9. In an apparatus for dyeing, bleaching, or otherwise treating yarn, in cops, the following instrumentalities in combination: first, a fixed tank; second, a perforated reciprocating cop carrier; third, an air-exhausting chamber in communication with an air-exhausting device; fourth, a charging conduit in communication with a charging pump; and, fifth, suitable means, essentially, for instance, such as set forth, for maintaining the foregoing instrumentalities in their given relative disposition, substantially as set forth.

10. In an apparatus for dyeing, bleaching, or otherwise treating, yarn in cops, the following instrumentalities in combination: first, a fixed tank; second, a perforated reciprocating cop carrier; third, an air-exhausting chamber in communication with an air-exhausting device; fourth, a charging conduit in communication with a charging pump; fifth, a liquid-exhausting conduit in communication with a liquid-exhausting pump; and, sixth, suitable means, essentially, for instance, such as set forth, for maintaining the foregoing instrumentalities in their given relative disposition; substantially as set forth.

11. In an apparatus for dyeing, bleaching, or otherwise treating yarn in cops; the following instrumentalities in combination: first, a tank to contain dyeing, bleaching, or other selected liquid; second, a perforated reciprocating cop carrier adapted to be supplied with removably applied cops; third, a charging conduit in exterior communication with a suction or pressure pump; and, fourth, a carrier body with reference to which the carrier reciprocates and which has a chamber in communication with said charging conduit, substantially as set forth.

12. In an apparatus for treating yarn in cops, the following instrumentalities in combination: first, a fixed frame-work; second, a perforated reciprocating cop carrier adapted to be supplied with removably applied cops; third, a liquid-exhausting conduit in exterior communication with a liquid exhausting pump; and fourth a carrier body with reference to which the cop carrier reciprocates and which has a chamber in communication with said liquid-exhausting conduit, substantially as set forth.

13. In an apparatus for dyeing, bleaching, or otherwise treating, yarn in cops, the following instrumentalities in combination: first, a tank to contain dyeing, bleaching, or other selected liquid; second, a perforated reciprocating cop carrier adapted to be supplied with removably applied cops; third, a charging conduit in exterior communication with a suction or pressure pump; fourth, a liquid-exhausting conduit in exterior communication with a liquid-exhausting pump; fifth, a carrier body with reference to which the cop-carrier reciprocates and which has a chamber in communication with the liquid-exhausting conduit and also a chamber in communication with the extracting conduit, substantially as set forth.

14. In an apparatus for dyeing yarn in cops, the following instrumentalities in combination: first, a fixed tank; second, a perforated reciprocating cop carrier; third, an air-exhausting conduit in communication with an air-exhausting pump; fourth, a charging conduit in communication with a charging pump; fifth, a liquid-exhausting conduit in communication with a liquid-exhausting pump; and, sixth, a carrier body in or with respect to which the conduits aforesaid terminate, substantially as set forth.

15. In an apparatus for dyeing, bleaching, or otherwise treating, yarn in cops, the following instrumentalities in combination: first, a tank to contain dyeing, bleaching, or other selected liquid; second, a carrier body partly contained within said tank and embodying one or more carrier ways; third, one or more reciprocating perforated cop carriers adapted to reciprocate with respect to the carrier body and into and out of the tank, substantially as set forth.

16. In an apparatus for dyeing, bleaching, or otherwise treating, yarn in cops, the following instrumentalities in combination: first, a tank to contain dyeing, bleaching, or other selected liquid; second, a carrier body partly contained within said tank and embodying one or more carrier ways; third, a charging conduit in exterior communication with a suction or pressure pump, the mouth or mouths of which open through said carrier body below the top level of the tank; fourth, one or more reciprocating cop carriers adapted to the ways in said carrier body and having perforations adapted to register with the mouth or mouths of the charging conduit, and, fifth, suitable means for occasioning the reciprocation of the carrier or carriers, substantially as set forth.

17. In an apparatus for dyeing, bleaching, or otherwise treating, yarn in cops, the following instrumentalities in combination: first, a tank to contain dyeing, bleaching, or other selected liquid; second, a carrier body partly contained within said tank and embodying one or more carrier ways; third, a charging conduit in exterior communication with a suction or pressure pump, the mouth or mouths of which open through said carrier body below the top level of the tank; fourth, a liquid-exhausting conduit in exterior communication with a liquid-exhausting pump, the mouth or mouths of which open through said carrier body above the top level of the tank; fifth, one or more reciprocating cop carriers adapted to the ways in said carrier body and having perforations adapted to register with the mouth or mouths of the conduits, and, sixth, suitable means for occasioning the reciprocation of the cop carrier or carriers, substantially as set forth.

18. In an apparatus for dyeing yarn in cops, the following instrumentalities in combination: first, a tank to contain dyeing, bleaching, or other selected liquid; second, a carrier body partly contained within said tank and embodying one or more carrier ways; third, a charging conduit in exterior communication with a suction or pressure pump, the mouth or mouths or which open through said carrier body below the top level of the tank; fourth, a liquid-exhausting conduit in exterior communication with a liquid-exhausting pump, the mouth or mouths of which open through said carrier body above the top level of the tank; fifth, an air-exhausting conduit in communication with an air-exhausting device, the mouth or mouths of which open through said carrier body below the top level of the tank; sixth, one or more reciprocating cop carriers adapted to the ways in said carrier body and having perforations adapted to register with the mouth or mouths of the conduits; and, seventh, suitable means for occasioning the reciprocation of the carrier or carriers, substantially as set forth.

19. In an apparatus for dyeing, bleaching, or otherwise treating, yarn in cops, the following instrumentalities in combination: first, a tank to contain dyeing, bleaching, or other selected liquid; second, a carrier body partly contained within said tank, embodying a pair of carrier ways, and also embodying conduit mouths or chambers; third, a pair of reciprocating cop carriers adapted to said ways in the carrier body and having perforations adapted to register with the conduit mouth or chambers; fourth, conduits leading from said chambers in the carrier body and in exterior communication with pumps; and, fifth, suitable means for occasioning the reverse reciprocation of the carriers, substantially as set forth.

20. In an apparatus for dyeing, bleaching, or otherwise treating, yarn in cops, the following instrumentalities in combination: first, a tank to contain dyeing, bleaching, or other selected liquid; second, a carrier body partly contained within said tank, embodying a pair of carrier ways, and also embodying conduit mouths or chambers; third, a pair of reciprocating cop carriers adapted to said ways in the carrier body and having perforations adapted to register with the conduit mouths or chambers; fourth, conduits leading from said chambers in the carrier body and in exterior communication with pumps; fifth, suitable means for occasioning the reverse reciprocation of said carriers; sixth, valves applied to said conduits; and, seventh, suitable means for automatically opening and closing said valves, substantially as and for the purposes set forth.

21. In an apparatus for dyeing, bleaching, or otherwise treating, yarn in cops, the following instrumentalities in combination: first, a tank to contain dyeing, bleaching, or other selected liquid; second, a carrier body partly contained within said tank, embodying a pair of carrier ways, and also embodying conduit mouths or chambers; third, a pair of reciprocating cop carriers adapted to said ways in the carrier body and having perforations adapted to register with the conduit mouths or chambers; fourth, conduits leading from said chambers in the carrier body and in exterior communication with pumps; fifth, a pair of racks respectively connected with the carriers; sixth, a pinion common to both racks for occasioning the reverse reciprocation of the same; and, seventh, means for oscillating said pinion, substantially as set forth.

22. In an apparatus for dyeing, bleaching, or otherwise treating, yarn in cops, the following instrumentalities in combination: first, a tank to contain dyeing, bleaching, or other selected liquid; second, a carrier body partly contained within said tank, embodying a pair of carrier ways, and also embodying conduit mouths or chambers; third, a pair of reciprocating cop carriers adapted to said ways in the carrier body and having perforations adapted to register with the conduit mouths or chambers; fourth, conduits leading from said chambers in the carrier body and in exterior communication with pumps; fifth, valves applied to said conduits; sixth, cam way plates connected with the carriers; and, seventh, mechanism, essentially, for instance, such as set forth, intermediate between said cam way plates and said valves for occasioning the automatic operation of the valves, substantially as set forth.

In testimony whereof I have hereunto signed my name this 3d day of June, A. D. 1887.

HOWARD RICHMOND.

In presence of—
 HENRY BOWEN,
 G. RICHMOND PARSONS.